United States Patent
Lim et al.

(10) Patent No.: US 10,078,796 B2
(45) Date of Patent: Sep. 18, 2018

(54) APPARATUS AND METHOD OF HAND GESTURE RECOGNITION BASED ON DEPTH IMAGE

(71) Applicant: KOREA INSTITUTE OF SCIENCE AND TECHNOLOGY, Seoul (KR)

(72) Inventors: Hwasup Lim, Seoul (KR); Sungkuk Chun, Seoul (KR); Sang Chul Ahn, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 207 days.

(21) Appl. No.: 15/052,063

(22) Filed: Feb. 24, 2016

(65) Prior Publication Data
US 2017/0068849 A1 Mar. 9, 2017

(30) Foreign Application Priority Data
Sep. 3, 2015 (KR) .................. 10-2015-0124899

(51) Int. Cl.
G06K 9/62 (2006.01)
G06K 9/00 (2006.01)
G06T 7/593 (2017.01)

(52) U.S. Cl.
CPC ....... *G06K 9/6202* (2013.01); *G06K 9/00389* (2013.01); *G06K 9/6218* (2013.01); *G06T 7/593* (2017.01); *G06T 2207/10028* (2013.01); *G06T 2207/30196* (2013.01)

(58) Field of Classification Search
None
See application file for complete search history.

(56) References Cited

U.S. PATENT DOCUMENTS

| 5,548,667 A * | 8/1996 | Tu ................. G06K 9/6206 382/115 |
| 9,002,099 B2 * | 4/2015 | Litvak ............. G06K 9/00382 345/653 |
| 2011/0268365 A1 | 11/2011 | Lou et al. |
| 2012/0068917 A1 | 3/2012 | Huang et al. |
| 2012/0268369 A1 | 10/2012 | Kikkeri |
| 2012/0309532 A1 * | 12/2012 | Ambrus ............ G06F 3/0425 463/36 |

(Continued)

FOREIGN PATENT DOCUMENTS

KR 10-0617976 B1 8/2006
KR 10-2007-0103895 A 10/2007

(Continued)

*Primary Examiner* — Matthew Bella
*Assistant Examiner* — Brian Shin
(74) *Attorney, Agent, or Firm* — NSIP Law

(57) ABSTRACT

Disclosed is an apparatus for hand gesture recognition based on a depth image, which includes a depth image acquiring unit configured to acquire a depth image including a hand region, a depth point classifying unit configured to classify depth points of a hand region in the depth image according to a corresponding hand portion by means of a machine studying method, and a hand model matching unit configured to match a three-dimensional hand model with the classified depth points by using distances between the classified depth points and a hand portion respectively corresponding to the depth points. A recognition method using the apparatus is also disclosed.

31 Claims, 18 Drawing Sheets

(56) References Cited

U.S. PATENT DOCUMENTS

| | | | |
|---|---|---|---|
| 2012/0327125 A1 | 12/2012 | Kutliroff et al. | |
| 2013/0058565 A1* | 3/2013 | Rafii | G06F 3/017 382/154 |
| 2013/0249786 A1* | 9/2013 | Wang | G06F 3/011 345/156 |
| 2013/0336524 A1* | 12/2013 | Zhang | G06K 9/00355 382/103 |
| 2014/0363076 A1 | 12/2014 | Han et al. | |
| 2014/0363088 A1 | 12/2014 | Cha et al. | |
| 2015/0253864 A1* | 9/2015 | Parkhomenko | G06F 3/017 345/156 |

FOREIGN PATENT DOCUMENTS

| | | |
|---|---|---|
| KR | 10-2012-0046607 A | 5/2012 |
| KR | 10-1350387 B1 | 1/2014 |
| KR | 10-1436050 B1 | 9/2014 |
| KR | 10-2015-0075481 A | 7/2015 |

* cited by examiner

APPARATUS AND METHOD OF HAND GESTURE RECOGNITION BASED ON DEPTH IMAGE

CROSS-REFERENCE TO RELATED APPLICATION

This application claims priority to Korean Patent Application No. 10-2015-0124899, filed on Sep. 3, 2015, and all the benefits accruing therefrom under 35 U.S.C. § 119, the contents of which in its entirety are herein incorporated by reference.

BACKGROUND

1. Field

Embodiments relate to an apparatus or method for hand gesture recognition based on a depth image, and more particularly, to an apparatus or method for recognizing and embodying a motion or shape of a hand by using a depth image including a hand region.

[Description about National Research and Development Support]

This study was supported by Project No. 1375025943 of Ministry of Culture, Sports and Tourism.

2. Description of the Related Art

In order to recognize a hand gesture or a hand shape, a user to be recognized may wear a device such as a special glove, and then the hand of the user may be photographed. However, in this method, the user may feel inconvenience while moving, and the device should be calibrated for each user.

To solve the above drawbacks, a vision-based recognition method for recognizing a hand shape based on a color image or depth image of a user without special equipment is being studied. When a hand shape is recognized using a color image, features of the hand extracted from the color image are very limited since the hand has a single color.

RELATED LITERATURES

Patent Literature (Patent Literature 1) Korean Patent Registration No. 10-0617976

(Patent Literature 2) US Patent Publication US2012/0268369 A1

SUMMARY

The present disclosure is directed to providing an apparatus and method for hand gesture recognition based on graphics and vision, which allows real-time recognition of a hand gesture based on a depth image, allows recognition of a finger motion not present in a database, and does not demand calibration works.

The technical object of the present disclosure is not limited to the above, but other objects not mentioned herein will be clearly understood from the following disclosure by those skilled in the art.

In one aspect, there is provided an apparatus for hand gesture recognition based on a depth image, comprising: a depth image acquiring unit configured to acquire a depth image including a hand region; a depth point classifying unit configured to classify depth points of the hand region in the depth image according to a corresponding hand portion by means of a machine studying method; and a hand model matching unit configured to match a three-dimensional hand model with the classified depth points by using distances between the classified depth points and a hand portion respectively corresponding to the depth points.

In the apparatus for hand gesture recognition based on a depth image according to an embodiment, the depth point classifying unit may classify depth points of the hand region into any one hand portion among a thumb, a forefinger, a middle finger, a ring finger, a little finger and a palm and label each of the depth points according to the classification.

In the apparatus for hand gesture recognition based on a depth image according to an embodiment, the depth point classifying unit may move the depth points of the hand region in a normal direction of a surface of the hand to be located in a hand skeleton region, cluster the depth points located in the hand skeleton region, and determine a representative depth point of each cluster, and the hand model matching unit may match the hand model with the representative depth points. Here, the depth point classifying unit may classify the hand region with respect to the representative depth points.

In the apparatus for hand gesture recognition based on a depth image according to an embodiment, the machine studying method may include at least one of a support vector machine, a random forest and a neural network theory.

In the apparatus for hand gesture recognition based on a depth image according to an embodiment, the hand model matching unit may match the three-dimensional hand model so that a sum of distances between a plurality of depth points and a three-dimensional hand model respectively corresponding to the plurality of depth points is minimized.

In the apparatus for hand gesture recognition based on a depth image according to an embodiment, the corresponding three-dimensional hand model may be a phalanx portion.

In the apparatus for hand gesture recognition based on a depth image according to an embodiment, the hand model matching unit may match the three-dimensional hand model by additionally using angle information between phalanges included in a finger.

In the apparatus for hand gesture recognition based on a depth image according to an embodiment, the hand model matching unit may match the three-dimensional hand model so that angles between phalanges of a single finger are proportional to each other.

In the apparatus for hand gesture recognition based on a depth image according to an embodiment, the hand model matching unit may match the three-dimensional hand model by additionally using a constraint condition for constraining the three-dimensional hand model to have a finger posture which is expressible by a human or a constraint condition for constraining a hand space including depth points of the hand region.

In the apparatus for hand gesture recognition based on a depth image according to an embodiment, when an unclassified hand portion is present among the thumb, the forefinger, the middle finger, the ring finger and the little finger, the hand model matching unit may match the corresponding three-dimensional hand model having any posture with the unclassified hand portion.

In the apparatus for hand gesture recognition based on a depth image according to an embodiment, the corresponding three-dimensional hand model having any posture may include a spring model at a finger joint.

In the apparatus for hand gesture recognition based on a depth image according to an embodiment, the depth point classifying unit may generate hand skeleton depth points representing a hand skeleton by using the depth points of the hand region in the depth image and classify the hand skeleton depth points according to a corresponding hand portion, and the hand model matching unit may match the three-dimensional hand model with the classified hand skeleton depth points.

In another aspect, there is provided a method for hand gesture recognition based on a depth image, comprising: acquiring a depth image including a hand region; classifying depth points of the hand region in the depth image according to a corresponding hand portion by means of a machine studying method; and matching a three-dimensional hand model with the classified depth points by using distances between the classified depth points and a hand portion respectively corresponding to the depth points.

In the method for hand gesture recognition based on a depth image according to an embodiment, the classifying of depth points according to a corresponding hand portion may include: classifying depth points of the hand region into any one hand portion among a thumb, a forefinger, a middle finger, a ring finger, a little finger and a palm; and labeling each of the depth points according to the classification.

In the method for hand gesture recognition based on a depth image according to an embodiment, the classifying of depth points according to a corresponding hand portion may include moving the depth points of the hand region in a normal direction of a surface of the hand to be located in a hand skeleton region, clustering the depth points located in the hand skeleton region, and determining a representative depth point of each cluster. In this case, the matching of a three-dimensional hand model may include matching the three-dimensional hand model with the representative depth points.

In the method for hand gesture recognition based on a depth image according to an embodiment, the machine studying method may include at least one of a support vector machine, a random forest and a neural network theory.

In the method for hand gesture recognition based on a depth image according to an embodiment, the matching of a three-dimensional hand model may include matching the three-dimensional hand model so that a sum of distances between a plurality of depth points and a three-dimensional hand model respectively corresponding to the plurality of depth points is minimized.

In the method for hand gesture recognition based on a depth image according to an embodiment, the corresponding three-dimensional hand model may be a phalanx portion.

In the method for hand gesture recognition based on a depth image according to an embodiment, the matching of a three-dimensional hand model may include matching the three-dimensional hand model by additionally using angle information between phalanges included in a finger.

In the method for hand gesture recognition based on a depth image according to an embodiment, the matching of a three-dimensional hand model may include matching the three-dimensional hand model so that angles between phalanges of a single finger are proportional to each other.

In the method for hand gesture recognition based on a depth image according to an embodiment, the matching of a three-dimensional hand model may further include applying a constraint condition for constraining the three-dimensional hand model to have a finger posture which is expressible by a human, or applying a constraint condition for constraining a hand space including depth points of the hand region.

In the method for hand gesture recognition based on a depth image according to an embodiment, the matching of a three-dimensional hand model may further include matching the corresponding three-dimensional hand model having any posture with an unclassified hand portion, when the unclassified hand portion is present among the thumb, the forefinger, the middle finger, the ring finger and the little finger.

In the method for hand gesture recognition based on a depth image according to an embodiment, the corresponding three-dimensional hand model having any posture may include a spring model at a finger joint.

In the method for hand gesture recognition based on a depth image according to an embodiment, the classifying of depth points according to a corresponding hand portion may include: generating hand skeleton depth points representing a hand skeleton by using the depth points of the hand region in the depth image and classifying the hand skeleton depth points according to a corresponding hand portion, and the matching of a three-dimensional hand model may include matching the three-dimensional hand model with the classified hand skeleton depth points.

In another aspect, there is provided a computer-readable recording medium, on which a program including instructions for executing the above method for hand gesture recognition is recorded.

The apparatus for hand gesture recognition according to an embodiment of the present disclosure may transform a three-dimensional model according to various finger sizes, recognize a finger motion not present in a database, ensure high accuracy by means of model matching, and not demand calibration works since a phalanx to which a depth point belongs is predicted by means of machine studying. By doing so, a hand gesture may be recognized from the depth image in real time, thereby allowing interactions between a computer and a user.

Effects of the present disclosure are not limited to the above, but other effects not mentioned herein will be clearly understood from the following disclosure by those skilled in the art.

BRIEF DESCRIPTION OF THE DRAWINGS

In FIG. 3, dots represent depth points.

DETAILED DESCRIPTION

Figure 1A:
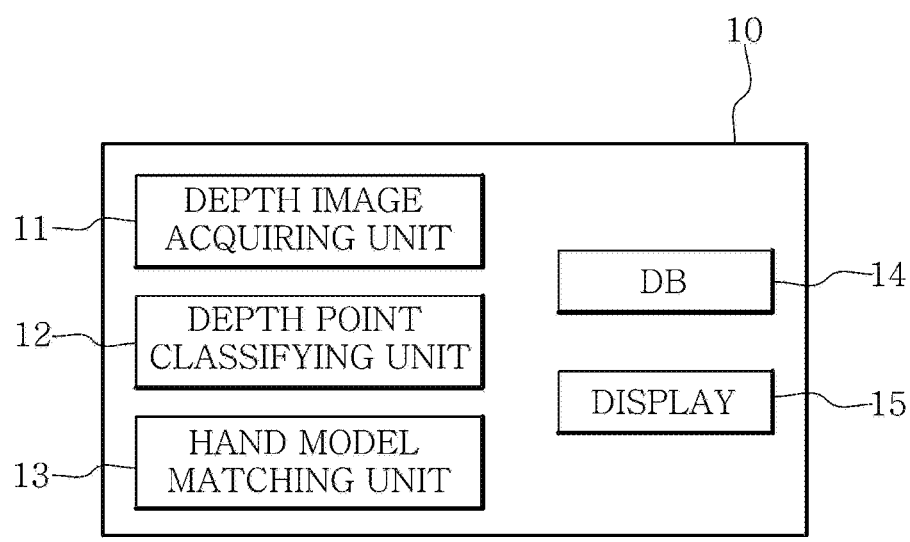
FIG. 1A is a diagram showing an apparatus for hand gesture recognition (hereinafter, also referred to as a "hand gesture recognition apparatus") based on a depth image according to an embodiment of the present disclosure.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. In the drawings, like reference numerals denote like elements. However, in the description, details of well-known features and techniques may be omitted to avoid unnecessarily obscuring the presented embodiments. In addition, the shape, size and regions, and the like, of the drawing may be exaggerated for clarity and may not mean the actual dimension.

The embodiments described in the specification may be implemented as hardware entirely, hardware partially and software partially, or software entirely. In the specification, the term "unit", "module", "device", "system" or the like indicates a computer-related entity like hardware, a combination of hardware and software, or software. For example, the term "unit", "module", "device", "system" or the like used in the specification may be a process, a processor, an object, an executable file, a thread of execution, a program, and/or a computer, without being limited thereto. For example, both a computer and an application executed in the computer may correspond to the term "unit", "module", "device", "system" or the like in the specification.

The embodiments have been described with reference to the flowchart shown in the figure. For brief explanation, the method has been illustrated and described as a series of blocks, but the present disclosure is not limited to the order of the blocks. In other words, some blocks may be executed simultaneously with other blocks or in a different order from those illustrated and described in this specification, and various diverges, flow paths, block sequences may also be implemented if they give the equivalent or similar results. In addition, in order to implement the method described in the specification, it is also possible not to demand all blocks. Further, the method for predicting a surgery stage may be implemented in the form of a computer program for executing a series of processes, and the computer program may also be recorded on a computer-readable recording medium.

Hereinafter, configurations and features of the present disclosure will be described in detail based on embodiments, but the embodiments are just for illustrations only and do not limit the present disclosure.

FIG. 1A is a diagram showing an apparatus for hand gesture recognition (hereinafter, also referred to as a "hand gesture recognition apparatus") based on a depth image according to an embodiment of the present disclosure. Referring to FIG. 1A, the hand gesture recognition apparatus 10 based on a depth image may include a depth image acquiring unit 11, a depth point classifying unit 12, and a hand model matching unit 13. In another embodiment, the hand gesture recognition apparatus 10 based on a depth image may further include a database 14 or a display 15.

Figure 2:
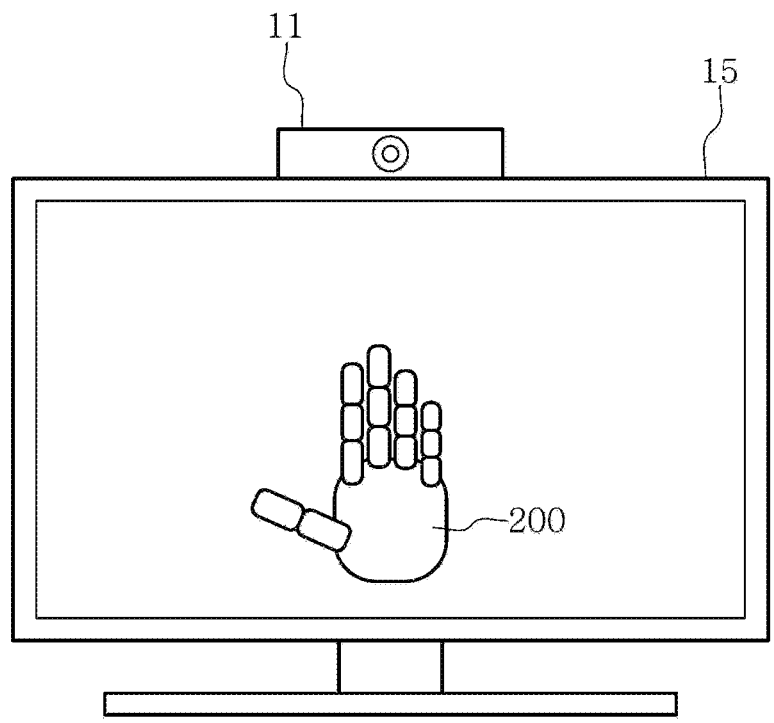
FIG. 2 shows an exemplary use state of the hand gesture recognition apparatus 10 based on a depth image.
Figure 2:
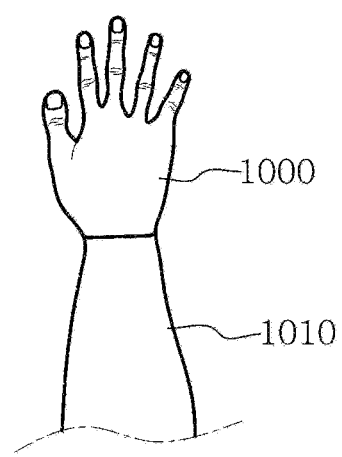

FIG. 2 shows an exemplary use state of the hand gesture recognition apparatus 10 based on a depth image. Referring to FIG. 2, the hand gesture recognition apparatus based on a depth image may photograph a user by using the depth image acquiring unit 11 and display a three-dimensional hand model 200 corresponding to a hand portion 1000 of the user on the display 15. The depth image acquiring unit 11 may exclude a wrist portion 1010 from the entire input image.

The hand gesture recognition apparatus 10 based on a depth image recognizes a motion of the hand 1000 at every frame and displays a three-dimensional hand model 200 corresponding thereto so that successive hand motions are embodied in a virtual space.

For this, the depth image acquiring unit 11 may acquire a depth image including a hand region. Here, the depth image acquiring unit 11 may include a depth camera. The depth camera may acquire distance information from a camera to a photographed object by means of an infrared sensor and generate a depth image. In this disclosure, each pixel having distance information may be called a depth point at the depth image.

Figure 3:
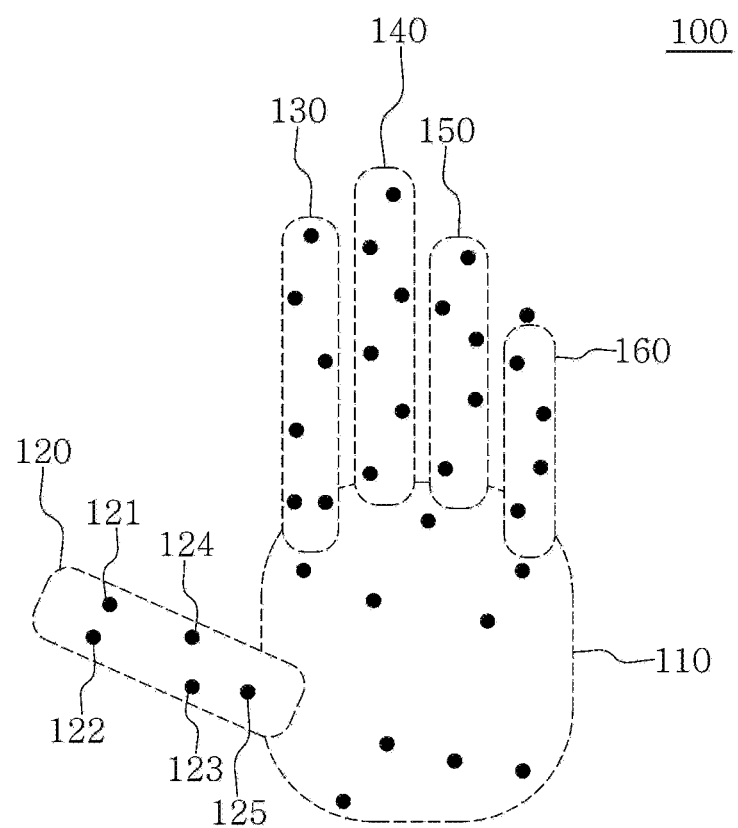
FIG. 3 shows depth points 100 classified for each hand portion.

FIG. 3 shows depth points 100 classified for each hand portion. In FIG. 3, dots represent depth points. For convenience, only several depth points are depicted in the figure.

The depth point classifying unit 12 classifies depth points 100 of the hand region in the depth image according to a corresponding hand portion by means of a machine studying method. Referring to FIG. 3, the depth point classifying unit 12 classifies a plurality of depth points to a corresponding hand portion so that the plurality of depth points are classified into a plurality of hand portions 110-160. In other words, the acquired depth points may be classified to be included in a single hand portion.

Also, in an embodiment, the depth point classifying unit 12 may cluster adjacent depth points, among the depth points corresponding to the hand region. After that, the depth point classifying unit 12 may determine a representative depth point for each cluster unit. For example, the representative depth point may be determined by using values of depth points included in the cluster.

Referring to FIG. 2, the hand region in the depth image is fully filled with depth points (marked in black), but referring to FIG. 3, the hand region has several depth points. Though the number of depth points used is not as small as depicted in FIG. 3, as understood by comparing the hand regions of FIGS. 2 and 3, all depth points expressing the entire hand region are not entirely used. In other words, the depth point classifying unit 12 primarily sorts depth points in an overall range.

After that, the depth point classifying unit 12 may label each finger region with respect to the sorted depth points. Or, in another embodiment, the depth point classifying unit 12 may also perform skeleton matching and finger region labeling with respect to the sorted depth points.

The depth points are partially sorted in order to improve a computing speed by reducing the number of depth points to be processed, before performing finger region sorting or skeleton matching with respect to all depth points corresponding to the hand region. In fact, when labeling or skeleton matching is performed after the above sorting process is performed, a processing speed is greatly improved.

In an example, in order to sort depth points, the depth point classifying unit 12 may group depth points of a depth image corresponding to the hand region into a cluster unit, and use only at least one depth point representing each cluster. In other words, only at least one representative depth point may be sorted among depth points corresponding to a predetermined area.

In order to sort a representative depth point, the depth point classifying unit 12 may scan the depth points of the depth image one by one (or, one line by one line), and simultaneously make the corresponding depth point be included in an existing cluster adjacent to the corresponding depth point on the basis of a distance to another adjacent depth point, or create a new cluster and make the corresponding depth point be included therein.

For example, if a distance between the corresponding depth point and an adjacent depth point is not greater than a predetermined value, the depth point classifying unit 12 may allocate the corresponding depth point to a cluster to which the adjacent depth point belongs, and if the distance is greater than the predetermined value, the depth point classifying unit 12 may create a new cluster and allocate the corresponding depth point thereto.

As a result, the surface area of the hand region may be classified into a plurality of clusters, and each cluster may include a representative depth point.

Afterwards, the embodiments of the present disclosure may perform calculation with respect to the representative depth points. In order to allocate each depth point (or, each line of depth points) to at least one cluster or create a new cluster, a basic sequential algorithm scheme (BSAS) may be used, without being limited thereto.

As shown in FIG. 3, the depth point classifying unit 12 may classify depth points of the hand region to any one hand portion among a palm 110 (or, a back of the hand), a thumb 120, a forefinger 130, a middle finger 140, a ring finger 150 and a little finger 160 and label each of the depth points according to the classification. Referring to FIG. 3, the depth points 121-125 may be classified to the hand portion 120 (the thumb finger) and labeled.

In order to classify each depth point to any one hand portion as described above, the depth point classifying unit 12 may use a machine studying method. In order to use the machine studying method, the database 14 may store depth data for each hand portion in relation to various hand postures. For example, depth data of a palm, a thumb, a forefinger, a middle finger, a ring finger and a little finger in a state where the use opens the hand or clenches the hand may be respectively included in the database 14.

Figure 1B:
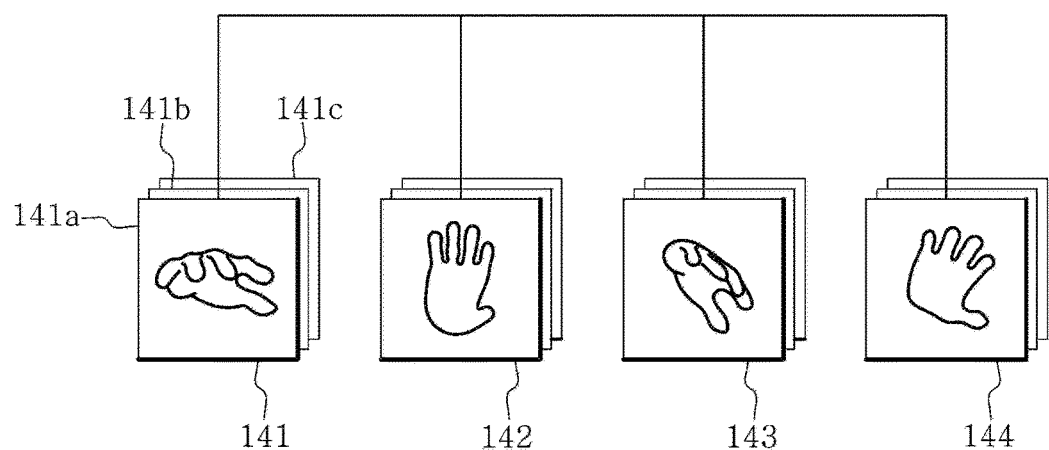
FIG. 1B is a diagram showing a structure of a database 14 storing hand shape depth images classified depending on depth values.

In addition, the database 14 may include hand shape depth data not only for a finger portion but also an entire hand. In this case, the database 14 may store standardized hand shape depth images. In detail, the database 14 may classify and store hand shape depth images depending on depth values. Referring to FIG. 1B, a structure of the database 14 in which hand shape depth images are classified and stored depending on depth values is depicted. If the hand shapes are similar or identical to each other, the depth values of the hand shape depth images are also similar or identical. Therefore, if the hand shape depth images are classified depending on depth values, similar or identical hand shapes are classified to be included in a single group. For example, assuming that the database 14 is classified into a first group 141, a second group 142, a third group 143 and a fourth group 144, these groups are defined as having different hand shapes, and the hand shape depth image in the first group stores a plurality of depth images 141A-141c similar or identical to each other.

In addition, the database 14 may store information of a hand joint angle corresponding to each hand shape depth image. The information about the hand joint angle may be stored in the database 14 together with the hand shape depth image as a pair.

The 'hand portion' may be fingers and a palm, or phalanges and a palm. Here, the palm may be classified into a plurality of regions. However, in an embodiment, depth data of each hand portion stored in the database 14 may be in relation to fingers and a palm. For example, depth data about five fingers and a palm may be included in the database 14. When depth data according to a hand posture is stored and used for each phalanx, more time is taken for processing data. Thus, depth points in the depth image may be classified based on fingers and a palm.

The machine studying method used by the depth data classifying unit 12 may be at least one of a support vector machine, a random forest and a neural network theory, but the present disclosure is not limited thereto.

Figure 4:
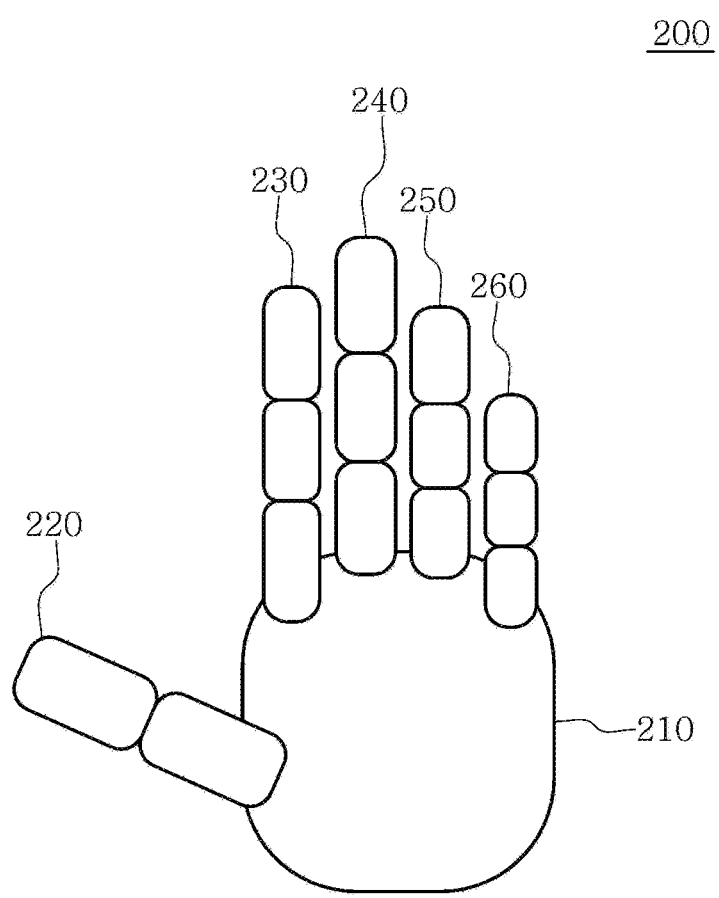
FIG. 4 shows a three-dimensional hand model.

FIG. 4 shows a three-dimensional hand model. A palm 210 and fingers 220-260 of the three-dimensional hand model 200 may be classified into a plurality of portions. For example, a finger may be classified into phalanges. Therefore, the thumb finger 220 may be classified into two phalanges, and other fingers may be classified into three phalanges. The palm is expressed as a single volume, but in another embodiment, the palm may be composed of a plurality of volumes.

The hand model matching unit 13 may match a three-dimensional hand model with the classified depth points by using distances between the classified depth points and a hand portion respectively corresponding to the depth points. For example, the hand model matching unit 13 may match the three-dimensional hand model 200 depicted in FIG. 4 with the depth points depicted in FIG. 3.

In order to allow the three-dimensional hand model to have the same posture as a hand posture of a current user, the hand model matching unit 13 may suitably move the three-dimensional hand model so that a distance between a depth point and a hand portion of the three-dimensional hand model corresponding to the depth point is minimized.

Figure 5:
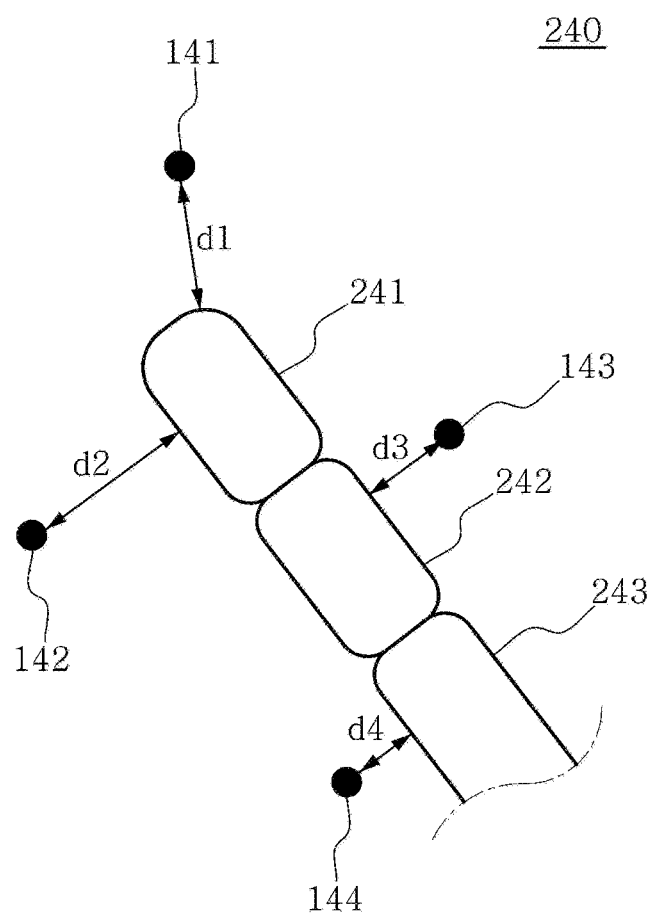
FIG. 5 is a diagram showing a state where a middle finger portion of a three-dimensional hand model is matched by using a distance between a depth point and a hand portion of the three-dimensional hand model.

FIG. 5 is a diagram showing a state where a middle finger portion of a three-dimensional hand model is matched by using a distance between a depth point and a hand portion of the three-dimensional hand model. Referring to FIG. 5, the middle finger 240 of the three-dimensional hand model is classified into a distal phalanx 241, a middle phalanx 242 and a proximal phalanx 243. In addition, by the depth point classifying unit 12, the depth points 141-144 are classified and labeled to correspond to the middle finger 240 of the three-dimensional hand model.

The hand model matching unit 13 may match the three-dimensional hand model with a plurality of depth points 141-144 so that a sum of distances between the plurality of depth points 141-144 and a hand portion 240 of the three-dimensional hand model respectively corresponding to the plurality of depth points is minimized. In other words, in FIG. 5, the hand portion of the three-dimensional hand model may be moved to a location where the sum of distances d1, d2, d3, d4 between the depth points and the three-dimensional hand model is minimized.

If the plurality of depth points 141-144 is labeled with respect to a hand portion (for example, a middle finger), the plurality of depth points 141-144 may calculate distance information to the corresponding entire hand portion (the middle finger). In addition, if the plurality of depth points 141-144 is labeled with respect to a finger portion (for example, each phalanx of the middle finger), the plurality of depth points 141-144 may calculate distance information to each corresponding finger portion (each finger joint of the middle finger).

When matching the three-dimensional hand model, the hand model matching unit 13 according to an embodiment of the present disclosure may apply several constraint conditions as follows when calculating distance information between the depth points and the hand portion of the three-dimensional hand model, thereby improve a matching rate. The hand model matching unit 13 may apply the distance between the three-dimensional hand model and the depth points as well as the following constraint conditions and then complete matching of the three-dimensional hand model to settle a hand gesture of the three-dimensional hand model. For simple and clear explanation, the matching constraint conditions will be described based on one or two fingers depicted in the figures, but it should be understood that this explanation can also be identically applied to other fingers and a palm.

Additional Matching Constraint Condition 1

Figure 6:
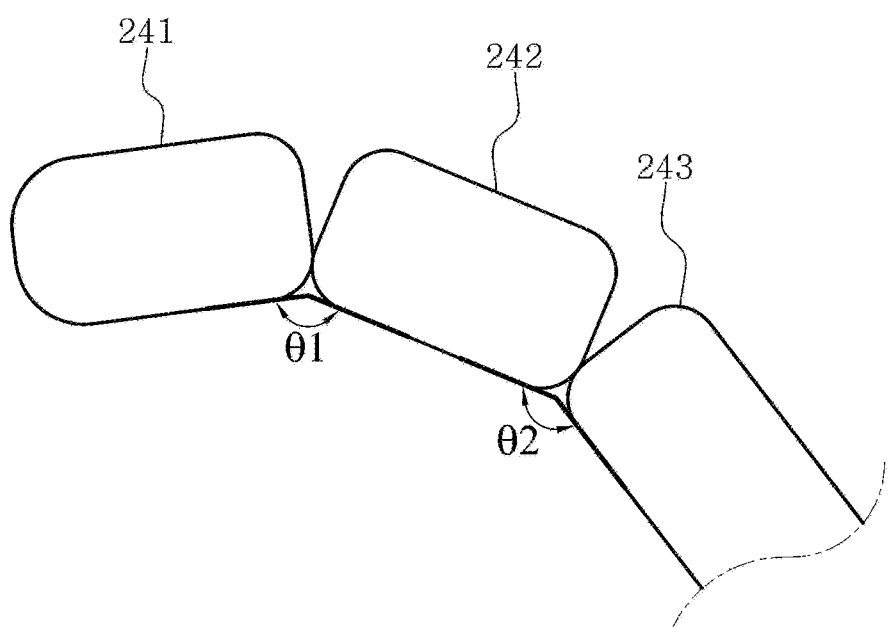
FIG. 6 is a diagram for illustrating a matching constraint condition using an angle between phalanges.

FIG. 6 is a diagram for illustrating a matching constraint condition using an angle between phalanges. The hand model matching unit 13 may match the three-dimensional hand model by additionally using angle information between phalanges included in a finger. Referring to FIG. 6, the hand model matching unit 13 may match the three-dimensional hand model by using an angle θ1 between a distal phalanx 241 and a middle phalanx 242 of the middle finger 240 and an angle θ2 between the middle phalanx 242 and a proximal phalanx 243. Generally, when a finger is bent, the angles θ1 and θ2 (FIG. 6) between phalanges may be proportional to each other. Therefore, when a finger of the three-dimensional hand model is bent, the hand model matching unit 13 may match the three-dimensional hand model by applying a constraint condition so that the angles between phalanges of the finger are proportional to teach other.

Additional Matching Constraint Condition 2

Figure 7:
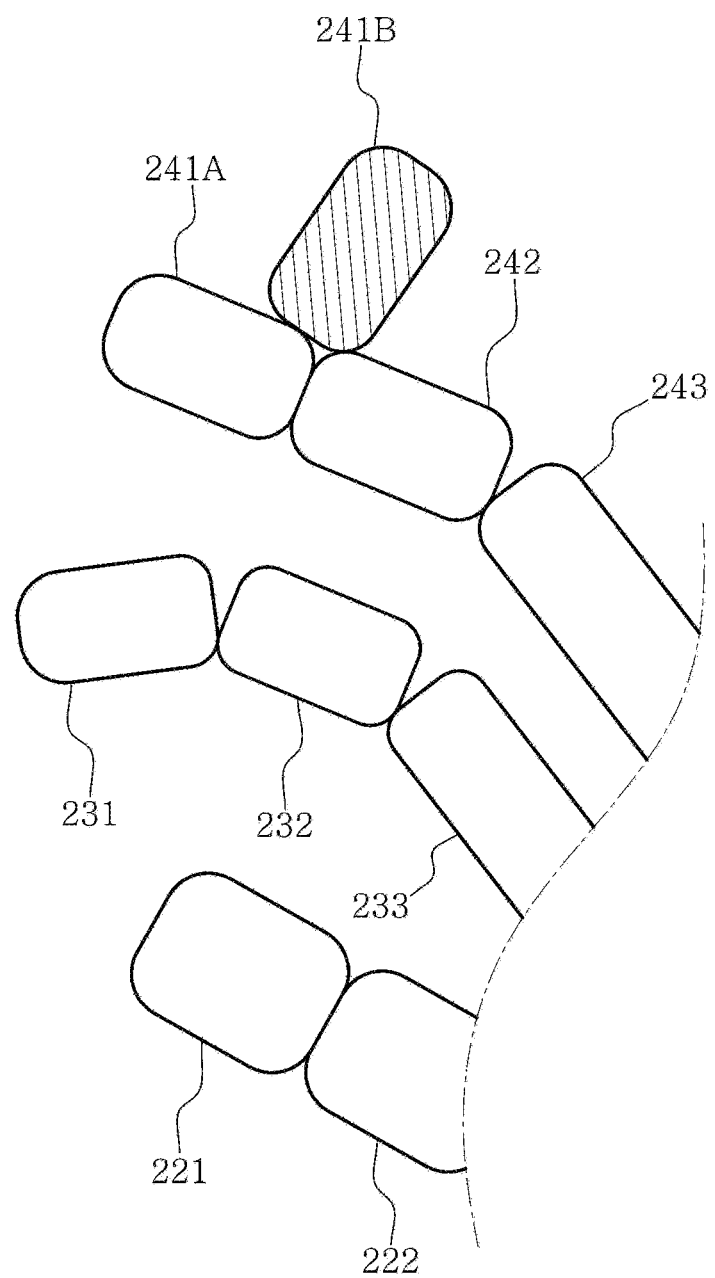
FIG. 7 is a diagram for illustrating a matching constraint condition for a finger posture which is expressible by a human.

FIG. 7 is a diagram for illustrating a matching constraint condition for a finger posture which is expressible by a human. The hand model matching unit 13 may constrain a location of a phalanx to be limited to a finger posture which is expressible by a human. Referring to FIG. 7, it may be understood that the depicted hand is a right hand, based on locations of the thumb finger 220 and the forefinger 230 and bending directions of the thumb finger 220 and the forefinger 230. However, if the distal phalanx of the middle finger can be a distal phalanx candidate group 251A or a distal phalanx candidate group 251B after the hand model matching unit 13 applies another matching condition (for example, a distance between a depth point and a hand portion of the hand model), since the distal phalanx candidate group 251B is not included in a general hand motion region as a finger posture which is not expressible by a human, the hand model matching unit 13 may neglect the distal phalanx candidate group 251B and apply the distal phalanx candidate group 251A. In addition, if there is no candidate group for an expressible region like the distal phalanx candidate group 251A, the hand model matching unit 13 may arbitrarily match the hand model portion with a location expressible by a human.

Additional Matching Constraint Condition 3

Figure 8:
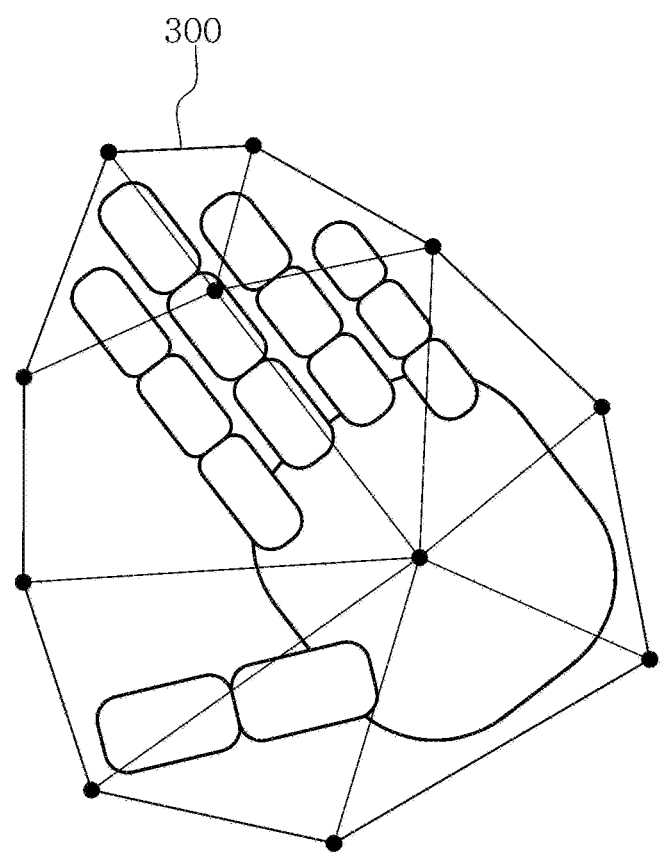
FIG. 8 is a diagram for illustrating a matching constraint condition for a hand space including depth points of a hand region.

FIG. 8 is a diagram for illustrating a matching constraint condition for a hand space including depth points of a hand region. The hand model matching unit 13 may constrain a location of the three-dimensional hand model so that the three-dimensional hand model is matched within a volume formed by the depth points of the hand region. Referring to FIG. 8, the hand model matching unit 13 may define a convex hull 300 formed by outermost depth points corresponding to a hand region in a virtual space and constrain a location of the three-dimensional hand model so that the three-dimensional hand model is located within the convex hull.

Matching of an Unclassified Hand Portion

Figure 9A:
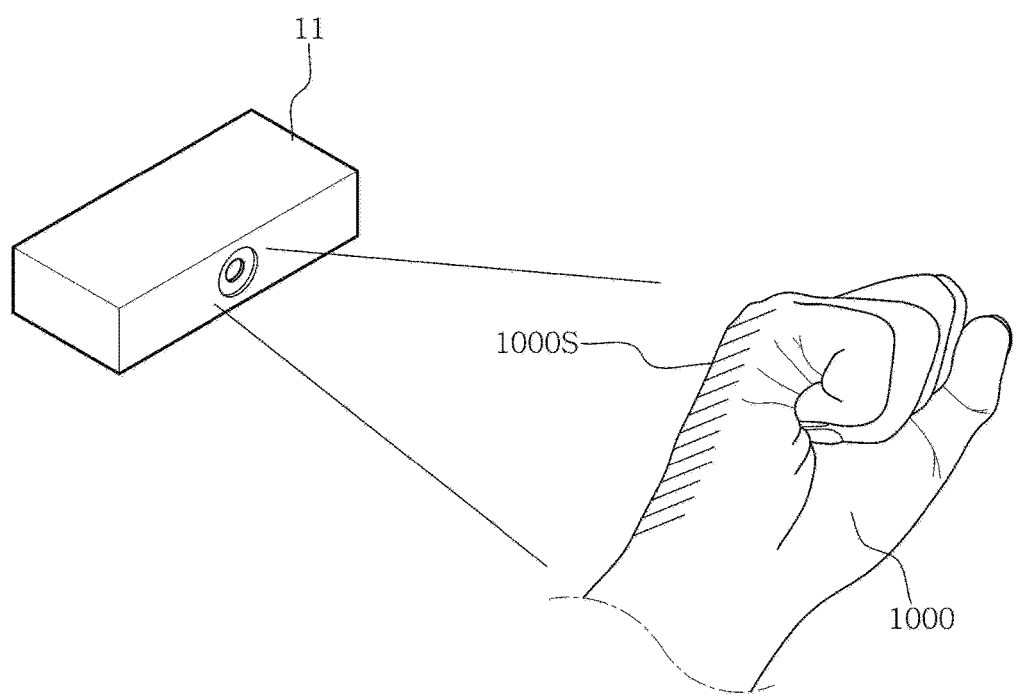
FIGS. 9A to 9C are diagrams for illustrating matching of a three-dimensional hand model for a part of five finger portions which is not classified into predetermined finger portions.
Figure 9B:
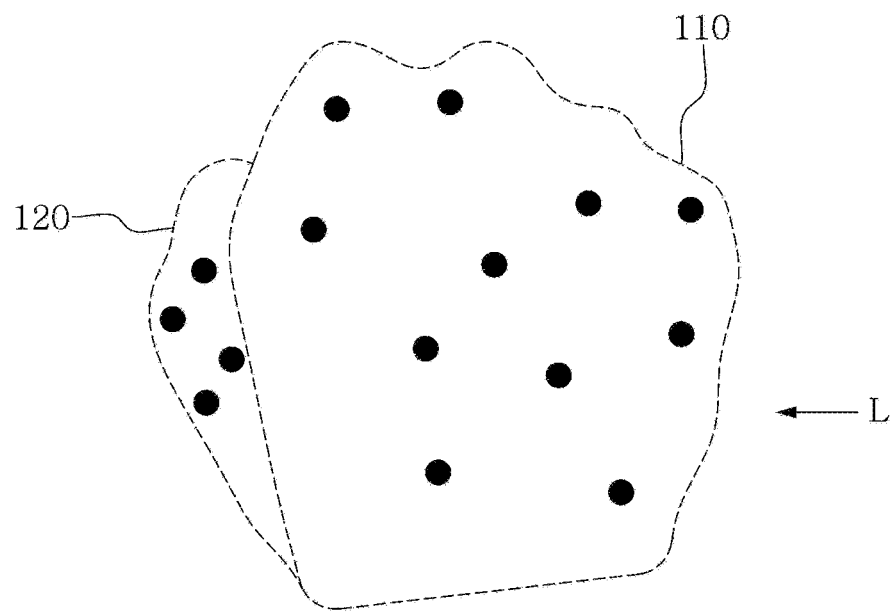
Figure 9C:
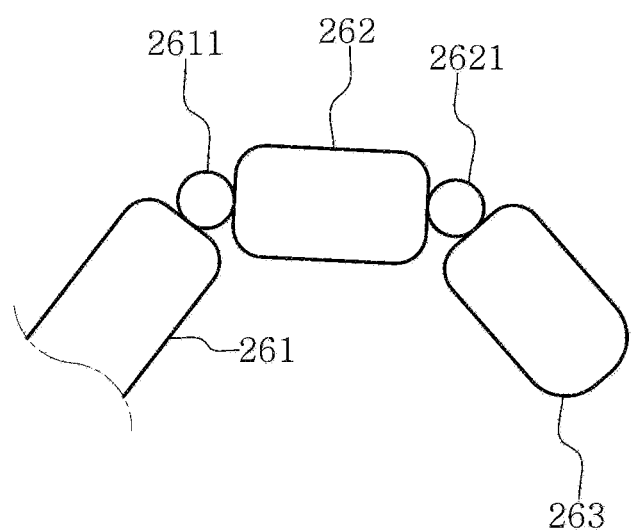

FIGS. 9A to 9C are diagrams for illustrating matching of a three-dimensional hand model for a part of five finger portions which is not classified into predetermined finger portions. Referring to FIG. 9A, a back of the hand of the user is toward the depth camera. In this case, depth information may be obtained by the depth camera only for the back portion of the hand or for the back portion of the hand and proximal phalanx portions of fingers. For example, as shown in FIG. 9B, the depth image may be acquired to include only depth points for the back 110 of the hand a first phalanx 221 of the thumb finger.

The hand model matching unit 13 matches the three-dimensional hand model by using the acquired depth points. However, since depth points corresponding to a middle phalanx or a distal phalanx of the finger are not present, it comes into question how to combine the middle phalanx or the distal phalanx of the finger of the three-dimensional hand model. In addition, even though FIG. 9B depicts that depth points of the proximal phalanx of the finger are acquired, it is also possible that depth points for the proximal phalanx are not acquired.

In this case, the hand model matching unit 13 may match a corresponding three-dimensional hand model having any posture with an unclassified hand portion. FIG. 9C shows a state of the little finger 260 when the three-dimensional hand model of FIG. 9B is observed in an L direction.

Since depth points corresponding to the proximal phalanx 261 to the distal phalanx 263 of the little finger are not present, the hand model matching unit 13 may not easily recognize an actual posture of a finger of the user. Therefore, the hand model matching unit 13 may match a three-dimensional hand model having any posture for the corresponding hand portion. The three-dimensional hand model having any posture may include a spring model at a joint between phalanges.

Referring to FIG. 9C, in the little finger, the middle phalanx 262 and the distal phalanx 263 are matched to any posture, and at this time, spring models may be included at a joint portion 2611 between the proximal phalanx 261 and the middle phalanx 262 and a joint portion 2621 between the middle phalanx 262 and the distal phalanx 263. As a result, the hand model portion matched to any posture may be naturally shaken with a relaxed comfortable posture by the user.

Improvement of Speed Using Skeleton Matching

The depth point classifying unit 12 employed in the hand gesture recognition apparatus 10 based on a depth image according to an embodiment of the present disclosure may generate hand skeleton depth points representing a hand skeleton by using the depth points of the hand region in the depth image and classify the hand skeleton depth points according to the corresponding hand portion. After that, the hand model matching unit 13 may match the three-dimensional hand model with the classified hand skeleton depth points.

Figure 10A:
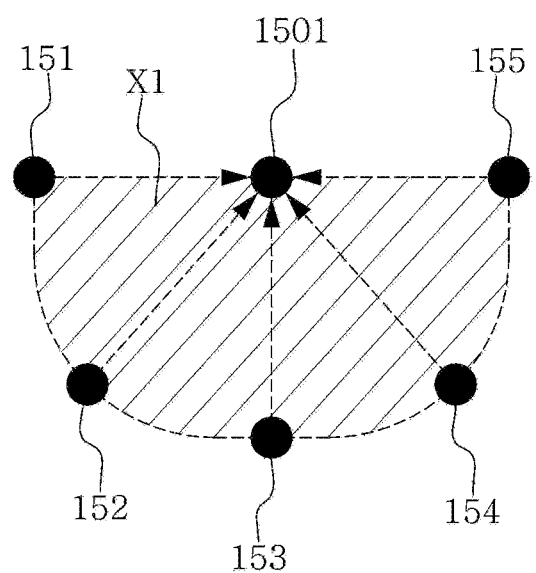
FIGS. 10A to 10C are diagrams for illustrating matching of a hand model using hand skeleton depth points.
Figure 10B:
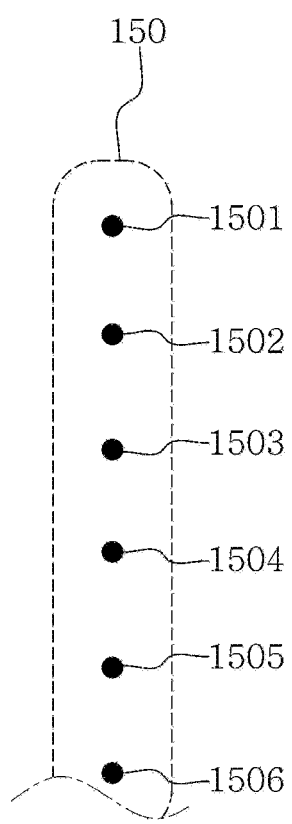
Figure 10C:
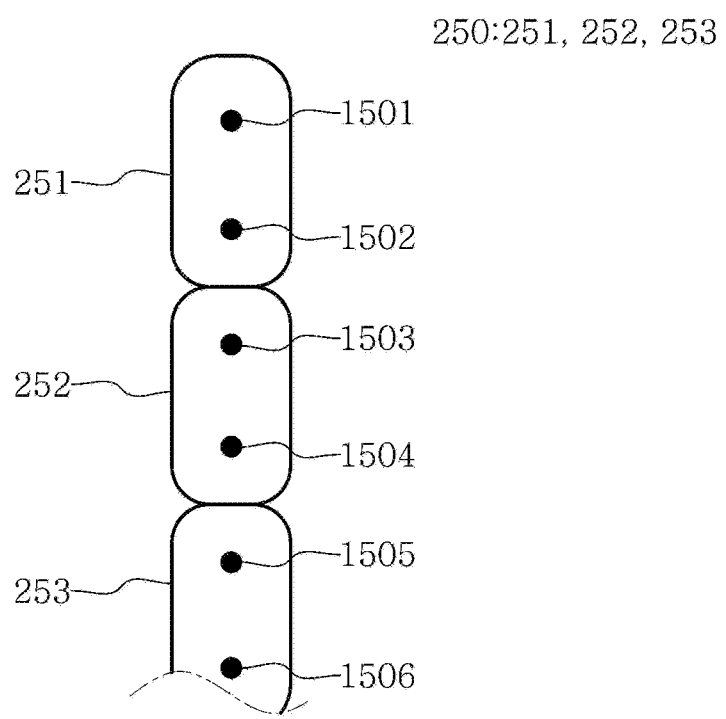

FIGS. 10A to 10c are diagrams for illustrating matching of a hand model using hand skeleton depth points. FIG. 10A is a diagram for illustrating a process of generating hand skeleton depth point. FIG. 10A depicts depth points and hand skeleton depth points of a ring finger portion 150 of FIG. 3, observed in a U direction. Referring to FIGS. 3 and 10A, since the depth camera is toward the palm, depth points for the back of the hand are not acquired. In other words, as shown in FIG. 10A, depth points 151-155 for the palm of the ring finger are obtained. The depth point classifying unit 12 may generate a hand skeleton depth point 1501 by using the depth points 151-155. The hand skeleton depth point 1501 may be one point of a fan-shaped region X1 formed by the depth points 151-155. In an example, the one point may be a center point between two depth points 151, 155 which are located farthest on the same plane, but the present disclosure is not limited thereto.

In an example, the depth point classifying unit 12 may move depth points in a normal direction of a surface of the hand. The depth points moved in a normal direction of the hand surface may be collected in the hand skeleton region. After (or, before) the depth points at the hand surface are moved to the hand skeleton region, the depth point classifying unit 12 may cluster depth points adjacent to each other within a predetermined distance, and determine a representative depth point by using the depth points in each cluster.

Here, the representative depth point may have a depth value which may represent the depth points included in the corresponding cluster. In addition, by determining the representative depth point as described above, the number of depth points to be process may be reduced, thereby improving a data processing speed greatly.

Components of the hand gesture recognition apparatus 10 based on a depth image according to an embodiment of the present disclosure may use the representative depth point in order to classify hand regions or recognize hand motions.

FIG. 10B shows hand skeleton depth points 1501-1506 generated for the entire ring finger portion 150 by using the depth points representing the hand portion as described above.

By generating representative depth points with respect to a hand skeleton region, it may be understood that the number of depth points representing the hand, which are present as much as a surface area of the hand, greatly decreases as changing from an area of the hand portion to a line of the hand portion. In other words, hand skeleton depth points of a single line may express a shape of the ring finger, instead of numerous depth points covering the section of the ring finger. In this case, the hand model matching unit 13 may match the hand model with the representative depth points of the hand skeleton region as shown in FIG. 10c.

By using the representative depth points of the hand skeleton region as described above, the number of depth points to be treated is greatly decreased, and which may greatly reduce the data processing time consumed from acquiring the depth points to matching the three-dimensional hand model. Experimentally, the time consumed from acquiring a depth image to classifying hand skeleton depth points representing the hand to a hand portion is reduced to $\frac{1}{10}$ in comparison to the case where all depth points representing the hand are classified to a hand portion. In other words, the processing speed increases over 10 times.

Even though the above explanation has been based on a ring finger, the above explanation may be identically applied to other hand portions, and hand skeleton depth points may be acquired therefrom.

As described above, the hand model matching unit 13 may use depth points classified to a hand portion and match the three-dimensional hand model having the corresponding hand portion to depth points. In addition, in the above matching, the matching constraint conditions 1 to 3 may be applied to enhance the matching rate. In addition, when depth points to be matched to a predetermined portion of the three-dimensional hand model are not present, the hand model matching unit 13 may match the corresponding portion of the three-dimensional hand model to any posture by using other neighboring depth points, and at this time, a spring model may also be added between phalanges to be matched.

Figure 11:
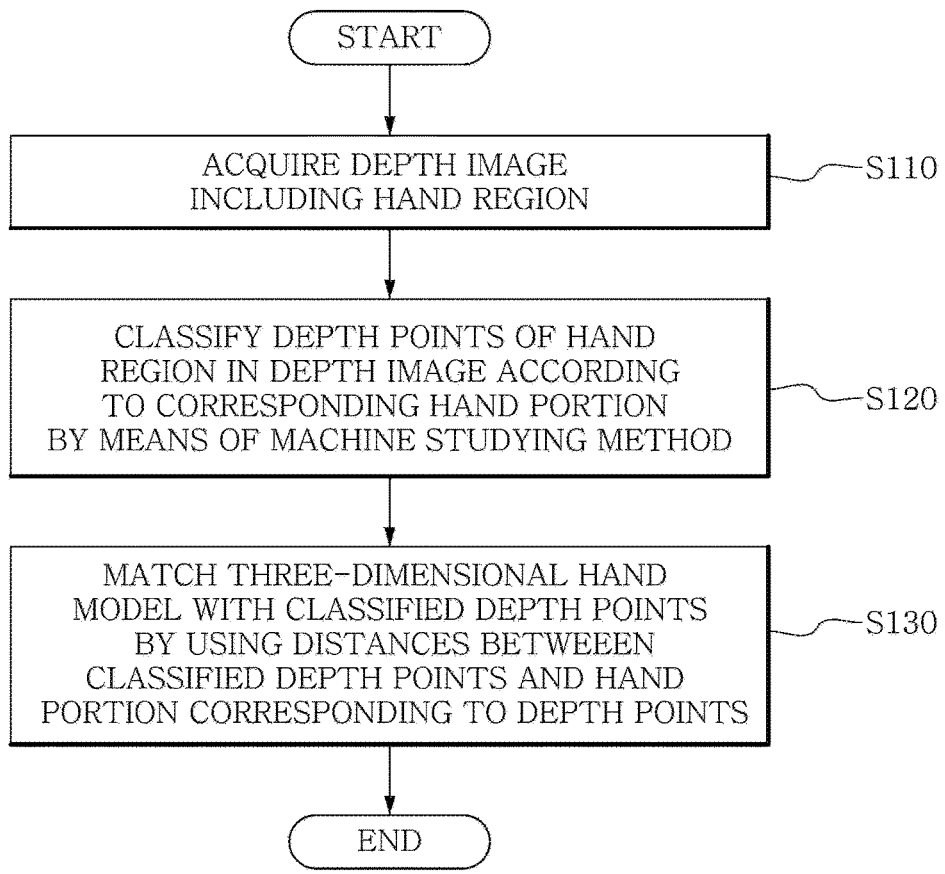
FIG. 11 is a flowchart for illustrating a method for hand gesture recognition based on a depth image according to an embodiment of the present disclosure.

FIG. 11 is a flowchart for illustrating a method for hand gesture recognition based on a depth image according to an embodiment of the present disclosure. The method for hand gesture recognition based on a depth image may include acquiring a depth image including a hand region (S110), classifying depth points of the hand region in the depth image according to a corresponding hand portion by means of a machine studying method (S120), and matching a three-dimensional hand model with the classified depth points by using distances between the classified depth points and a hand portion respectively corresponding to the depth points (S130).

In an embodiment, S120 of classifying depth points according to a corresponding hand portion may include classifying depth points of the hand region into any one hand portion among a thumb, a forefinger, a middle finger, a ring finger, a little finger and a palm and labeling each of the depth points according to the classification. The labeled depth point serves as an index for matching the three-dimensional hand model. In addition, the mentioned machine studying method may include at least one of a support vector machine, a random forest and a neural network theory, but the present disclosure is not limited thereto.

S130 of matching a three-dimensional hand model may match the three-dimensional hand model so that a sum of distances between a plurality of depth points and a three-dimensional hand model respectively corresponding to the plurality of depth points is minimized.

In addition, a portion of the three-dimensional hand model respectively corresponding to a plurality of depth points may be a phalanx portion. In this case, the depth points may be classified and labeled depending on the corresponding hand portion (for example, whether it is a middle finger or a ring finger) and the corresponding phalanx of the finger (for example, whether a distal phalanx or a middle phalanx).

In addition, S130 of matching a three-dimensional hand model may match the three-dimensional hand model by additionally using angle information between phalanges included in a finger. Here, the angle information may be set so that angles between phalanges of the finger are proportional to each other.

In addition, S130 of matching a three-dimensional hand model may match the three-dimensional hand model by additionally using a finger posture constraint for constraining to a finger posture which is expressible by a human or a hand space constraint for constraining to include the depth points of the hand region.

In addition, when an unclassified hand portion is present among the thumb, the forefinger, the middle finger, the ring finger and the little finger, S130 of matching a three-dimensional hand model may match the corresponding three-dimensional hand model having any posture with the unclassified hand portion. At this time, the corresponding three-dimensional hand model having any posture may include a spring model at a finger joint.

Here, S120 of classifying depth points according to a corresponding hand portion may include generating hand skeleton depth points representing a hand skeleton by using the depth points of the hand region in the depth image and classifying the hand skeleton depth points according to a corresponding hand portion. In addition, S130 of matching a three-dimensional hand model may include matching the three-dimensional hand model with the classified hand skeleton depth points.

Figure 12:
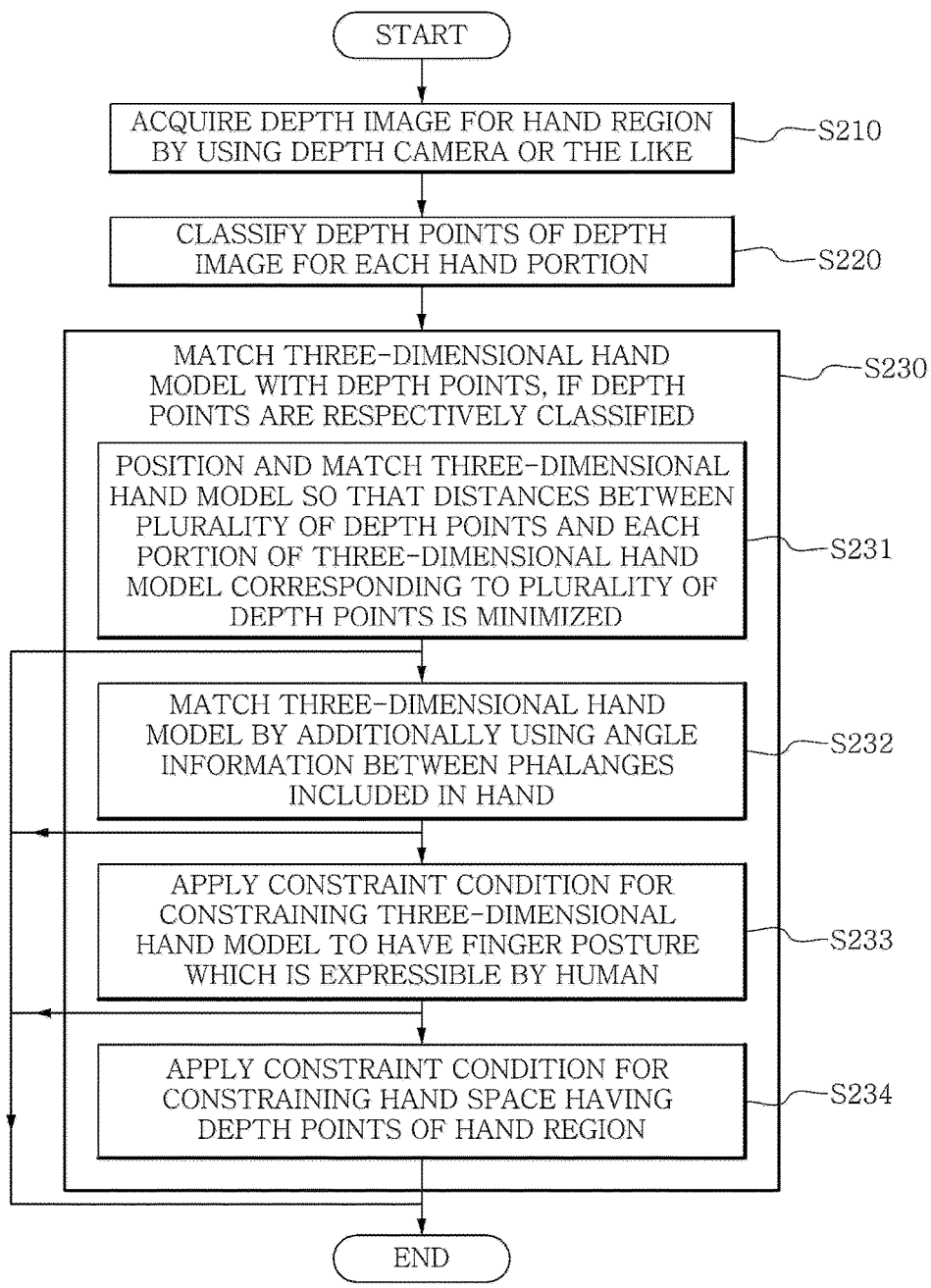
FIG. 12 is a flowchart for illustrating a method for hand gesture recognition based on a depth image according to another embodiment of the present disclosure.

FIG. 12 is a flowchart for illustrating a method for hand gesture recognition based on a depth image according to another embodiment of the present disclosure. First, a depth image for a hand region is acquired by using a depth camera or the like (S210), and then depth points of the depth image are classified for each hand portion (S220). The classified hand portion may include a palm, a thumb, a forefinger, a middle finger, a ring finger and little finger, and the hand portion may be classified in more detail. For example, the hand portion may be classified based on each phalanx of a finger.

If the depth points are classified respectively, the three-dimensional hand model is matched with the depth points (S230). Each hand portion of the three-dimensional hand model is matched with depth points corresponding thereto. In detail, the three-dimensional model may be positioned and matched so that a sum of distances between a plurality of depth points and each portion of the three-dimensional hand model corresponding to the plurality of depth points may be minimized (S231).

The three-dimensional hand model may be completely matched just with S231 above. However, in another embodiment, S232 to S234 may be further executed to complete matching. S231 to S234 may be executed in various orders, and any step may be more iteratively performed in comparison to another step.

In order to allow the motion of the three-dimensional hand model to be more identical to an actual hand motion, S230 of matching the three-dimensional hand model with the depth points may match the three-dimensional hand model by additionally using angle information between phalanges included in the finger (S232). Here, the three-dimensional hand model may be matched so that angles between phalanges included in the finger are proportional to each other.

In addition, in order to allow the motion of the three-dimensional hand model to be more identical to an actual hand motion, S230 of matching the three-dimensional hand model with the depth points may further include S233 of applying a constraint condition for constraining the three-dimensional hand model to have a finger posture which is expressible by a human or S234 of applying a constraint condition for constraining a hand space including depth points of the hand region.

Figure 13:
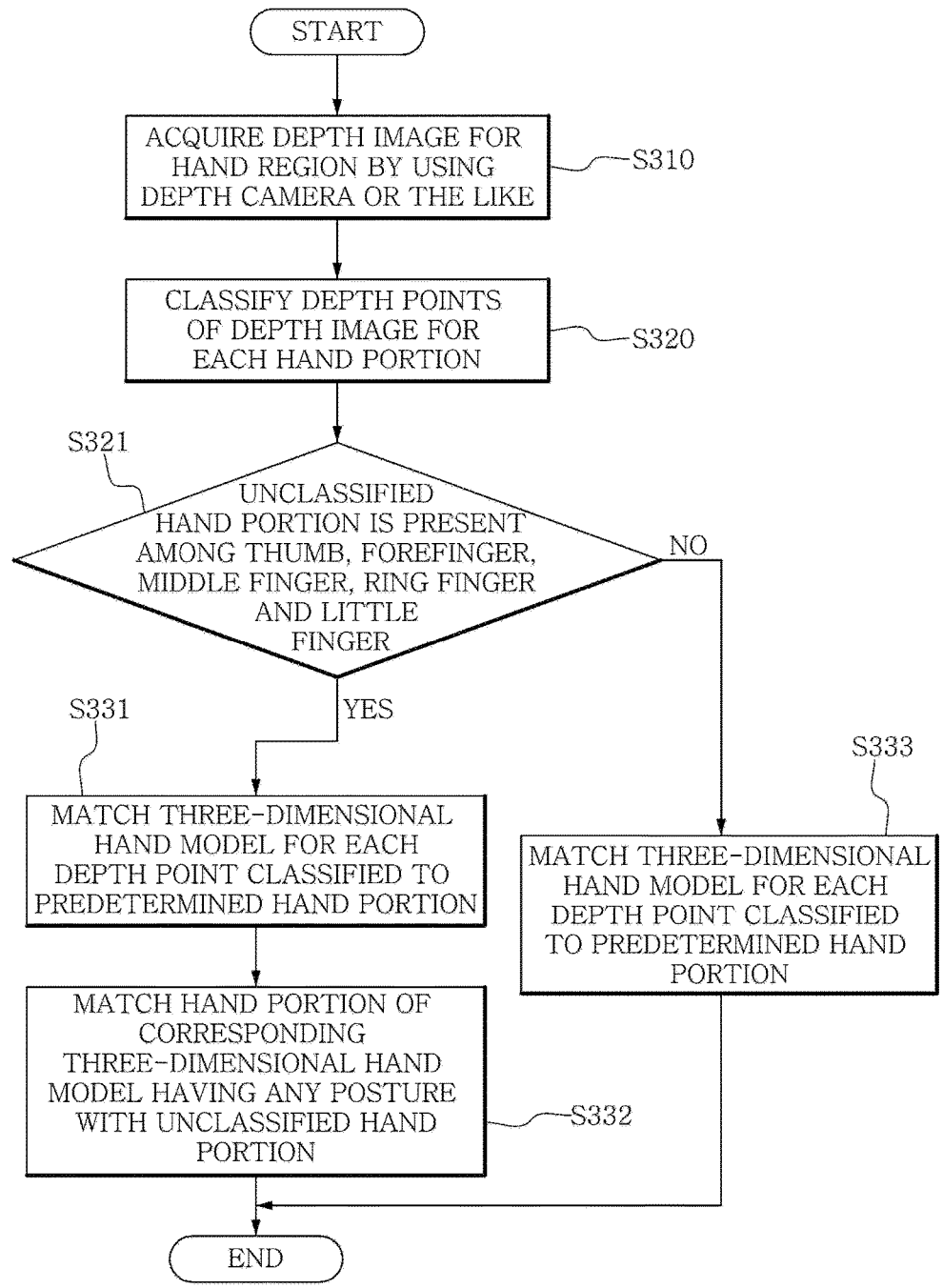
FIG. 13 is a flowchart for illustrating a case where an unclassified hand portion is present.

FIG. 13 is a flowchart for illustrating a case where an unclassified hand portion is present. Referring to FIG. 13, a depth image for a hand region is acquired by using a depth camera or the like (S310), and then depth points of the depth image are classified for each hand portion (S320).

After S320, it is determined whether there is an unclassified hand portion among a thumb, a forefinger, a middle finger, a ring finger and a little finger (S321). If an unclassified hand portion is present, the three-dimensional hand model is firstly matched with depth points respectively classified into a predetermined hand portion (S331).

After that, a hand portion of a corresponding three-dimensional hand model having any posture is matched with the unclassified hand portion (S332). When all depth points for the hand region are classified, if an unclassified hand portion is present, the corresponding hand portion may be matched with the hand portion of the three-dimensional hand model having any posture by using other neighboring depth points. In addition, if the three-dimensional hand model matched to any posture includes two or more phalanges, a spring model may be included at a joint of the phalanges. By means of the spring model, the three-dimensional hand model having any posture may naturally move.

In addition, when all depth points for the hand region are classified, if they are classified so that all hand portions are present, the three-dimensional hand model is matched for depth points respectively classified to a predetermined hand portion (S333).

S332 and S333 for matching may be performed in the same way as S230, and the detailed constraint conditions may also be applied identically.

If the matching is completed through the above procedure, a three-dimensional hand model having the same posture as a hand posture currently taken by the user may be displayed. This posture is displayed iteratively at each frame, thereby realizing a natural hand motion of the user by using the three-dimensional model.

While the exemplary embodiments have been shown and described, it will be understood by those skilled in the art that various changes in form and details may be made thereto without departing from the spirit and scope of this disclosure as defined by the appended claims. In addition, many modifications can be made to adapt a particular situation or material to the teachings of this disclosure without departing from the essential scope thereof.

Therefore, it is intended that this disclosure not be limited to the particular exemplary embodiments disclosed as the best mode contemplated for carrying out this disclosure, but that this disclosure will include all embodiments falling within the scope of the appended claims.

REFERENCE SYMBOLS

10: apparatus for hand gesture recognition based on a depth image
11: depth image acquiring unit
12: depth point classifying unit
13: hand model matching unit
14: database
15: display
100: depth points of a hand region
110, 120, 130, 140, 150, 160: hand portion
200: three-dimensional hand model
1000: actual hand

What is claimed is:

1. An apparatus for hand gesture recognition, comprising:
a processor configured to
acquire a depth image comprising a region of a hand performing a gesture,
classify depth points of the region in the depth image according to a corresponding hand portion,
match a three-dimensional hand model with the classified depth points, by using distances between the classified depth points and the corresponding hand portion, and by minimizing a sum of distances between a plurality of depth points and the three-dimensional hand model, and
track the gesture in an animation including the matched three-dimensional hand model.

2. The apparatus of claim 1, further comprising a memory configured to store instructions,
wherein the processor is further configured to execute the instructions to
acquire the depth image comprising the region of the hand performing the gesture,
classify the depth points of the region in the depth image according to the corresponding hand portion,
match the three-dimensional hand model with the classified depth points, by using the distances between the classified depth points and the corresponding hand portion, and by minimizing the sum of the distances between the plurality of depth points and the three-dimensional hand model, and
track the gesture in an animation including the matched three-dimensional hand model.

3. The apparatus of claim 1, wherein the processor comprises
a depth image acquiring unit configured to acquire the depth image comprising the region of the hand performing the gesture,
a depth point classifying unit configured to classify the depth points of the region in the depth image according to the corresponding hand portion, and
a hand model matching unit configured to
match the three-dimensional hand model with the classified depth points, by using the distances between the classified depth points and the corresponding hand portion, and by minimizing the sum of the distances between the plurality of depth points and the three-dimensional hand model, and
track the gesture in the animation including the matched three-dimensional hand model.

4. The apparatus of claim 3, wherein the depth points of the region in the depth image are classified according to the corresponding hand portion by a machine studying method.

5. The apparatus according to claim 4, wherein the depth point classifying unit is further configured to classify the depth points of the region into any one of a thumb, a forefinger, a middle finger, a ring finger, a little finger, and a palm, and label each of the depth points of the region according to the classification.

6. The apparatus according to claim 5, wherein the hand model matching unit is further configured to match the three-dimensional hand model with an unclassified hand portion, in response to the unclassified hand portion being present among the thumb, the forefinger, the middle finger, the ring finger, and the little finger.

7. The apparatus according to claim 6, wherein the three-dimensional hand model comprises a spring model at a finger joint.

8. The apparatus according to claim 4, wherein the machine studying method comprises any one or any combination of any two or more of a support vector machine, a random forest, and a neural network theory.

9. The apparatus according to claim 4, wherein the three-dimensional hand model comprises a phalanx portion.

10. The apparatus according to claim 4, wherein the hand model matching unit is further configured to match the three-dimensional hand model by using angle information between phalanges of a finger.

11. The apparatus according to claim 10, wherein the hand model matching unit is further configured to match the three-dimensional hand model so that angles between the phalanges of the finger are proportional to each other.

12. The apparatus according to claim 4, wherein the hand model matching unit is further configured to match the three-dimensional hand model by constraining the three-dimensional hand model to have a finger posture which is expressible by a human or constraining a hand space comprising points among the depth points of the region.

13. The apparatus according to claim 4, wherein
the depth point classifying unit is further configured to generate hand skeleton depth points representing a hand skeleton by using the depth points of the region in the depth image, and classify the hand skeleton depth points according to another corresponding hand portion, and
the hand model matching unit is further configured to match the three-dimensional hand model with the classified hand skeleton depth points.

14. The apparatus according to claim 4, wherein
the depth point classifying unit is further configured to move the depth points of the region in a normal direction of a surface of a hand to be located in a hand skeleton region, cluster the depth points located in the hand skeleton region into clusters, and determine a representative depth point of each cluster, and
the hand model matching unit is further configured to match the hand model with the representative depth points.

15. The apparatus of claim 1, further comprising:
a depth camera configured to capture the depth image; and
a display configured to display the matched three-dimensional hand model in a frame of the animation.

16. A method for hand gesture recognition, comprising:
acquiring a depth image comprising a region of a hand performing a gesture;
classifying depth points of the region in the depth image according to a corresponding hand portion;
matching a three-dimensional hand model with the classified depth points by using distances between the classified depth points and the corresponding hand portion; and
tracking the gesture in an animation including the matched three-dimensional hand model,
wherein the matching comprises matching the three-dimensional hand model so that angles between phalanges of a finger are proportional to each other.

17. The method according to claim 16, wherein the classifying of depth points comprises
classifying the depth points of the region into any one of a thumb, a forefinger, a middle finger, a ring finger, a little finger, and a palm, and
labeling each of the depth points of the region according to a result of the classifying of the depth points of the region.

18. The method according to claim 17, wherein the matching of the three-dimensional hand model comprises matching the three-dimensional hand model so that a sum of distances between the depth points and the corresponding three-dimensional hand model is minimized.

19. The method according to claim 18, wherein the three-dimensional hand model comprises a phalanx portion.

20. The method according to claim 17, wherein the matching of the three-dimensional hand model comprises matching the three-dimensional hand model with an unclassified hand portion, in response to the unclassified hand portion being present among the thumb, the forefinger, the middle finger, the ring finger, and the little finger.

21. The method according to claim 16, wherein the matching of a the three-dimensional hand model comprises constraining the three-dimensional hand model to have a finger posture which is expressible by a human, or constraining a hand space comprising points among the depth points of the region.

22. The method according to claim 21, wherein the corresponding three-dimensional hand model comprises a spring model at a finger joint.

23. The method according to claim 16, wherein
the classifying of the depth points comprises generating hand skeleton depth points representing a hand skeleton by using the depth points of the region in the depth image, and classifying the hand skeleton depth points according to another corresponding hand portion, and
the matching of the three-dimensional hand model comprises matching the three-dimensional hand model with the classified hand skeleton depth points.

24. The method according to claim 16, wherein
the classifying of depth points comprises moving the depth points of the region in a normal direction of a surface of the hand to be located in a hand skeleton region, clustering the depth points located in the hand skeleton region into clusters, and determining a representative depth point of each cluster, and
the matching of the three-dimensional hand model comprises matching the three-dimensional hand model with the representative depth points.

25. A non-transitory computer-readable medium storing instructions that, when executed by a processor, cause the processor to perform the method of claim 16.

26. The method of claim 16, wherein the classifying of the depth points comprises classifying the depth points of the region in the depth image according to the corresponding hand portion by a machine studying method.

27. The method according to claim 26, wherein the machine studying method comprises any one or any combination of any two or more of a support vector machine, a random forest, and a neural network theory.

28. The method of claim 16, further comprising displaying the matched three-dimensional hand model in a frame of the animation.

29. The method of claim 28, further comprising repeating the acquiring, the classifying, and the matching, for additional depth images, so that additional three-dimensional hand models are matched, wherein the animation includes additional frames in which the matched additional three-dimensional hand models are respectively displayed.

30. The method of claim 29, wherein gesture is recognized through the matching of the three-dimensional hand model and the matching of the additional three-dimensional hand models.

31. A method for hand gesture recognition based on a depth image, comprising:
acquiring a depth image comprising a region of a hand performing a gesture;
classifying depth points of the region in the depth image according to a corresponding hand portion by means of a machine studying method;
matching a three-dimensional hand model with the classified depth points by using distances between the classified depth points and the hand portion, which respectively corresponds to the depth points; and
tracking the gesture in an animation including the matched three-dimensional hand model,
wherein the classifying of the depth points of the region comprises classifying the depth points of the region into any one of a thumb, a forefinger, a middle finger, a ring finger, a little finger and a palm, and labeling each of the depth points according to the classification, and
wherein the matching of the three-dimensional hand model comprises matching the three-dimensional hand model so that a sum of distances between a plurality of depth points and the three-dimensional hand model, which respectively corresponds to the plurality of depth points, is minimized.

* * * * *